US012237959B2

(12) United States Patent
Liu et al.

(10) Patent No.: US 12,237,959 B2
(45) Date of Patent: *Feb. 25, 2025

(54) SEQUENCE GENERATING AND PROCESSING METHOD AND APPARATUS

(71) Applicant: HUAWEI TECHNOLOGIES CO., LTD., Guangdong (CN)

(72) Inventors: Kunpeng Liu, Beijing (CN); Mingxin Gong, Beijing (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,375

(22) Filed: Dec. 13, 2023

(65) Prior Publication Data

US 2024/0187292 A1 Jun. 6, 2024

Related U.S. Application Data

(63) Continuation of application No. 17/318,644, filed on May 12, 2021, now Pat. No. 11,894,963, which is a
(Continued)

(30) Foreign Application Priority Data

Nov. 13, 2018 (CN) .......................... 201811348559.8

(51) Int. Cl.
 *H04L 27/26* (2006.01)
 *H04J 13/10* (2011.01)
 *H04L 5/00* (2006.01)

(52) U.S. Cl.
 CPC .......... *H04L 27/2613* (2013.01); *H04J 13/10* (2013.01); *H04L 5/0048* (2013.01); *H04L 27/2614* (2013.01)

(58) Field of Classification Search
 CPC .............. H04L 27/2613; H04L 5/0048; H04L 27/2614; H04L 1/1812; H04J 13/10; H04W 72/23; H04W 72/1273
 See application file for complete search history.

(56) References Cited

U.S. PATENT DOCUMENTS 9,860,885 B2 * 1/2018 Aiba .................. H04W 72/23
10,051,509 B2 * 8/2018 Zhu ..................... H04L 47/125
(Continued)

FOREIGN PATENT DOCUMENTS

CN      102487532      6/2012
CN      103259635      8/2013
(Continued)

OTHER PUBLICATIONS

Oppo, "Discussion on RS enhancement for PAPR reduction," 3GPP TSG-RAN WG1 Meeting #95, R1-18102808, Spokane, USA, Nov. 12-16, 2018, 4 pages (Year: 2018).*
(Continued)

*Primary Examiner* — Ayaz R Sheikh
*Assistant Examiner* — Louis Samara
(74) *Attorney, Agent, or Firm* — Fish & Richardson P.C.

(57) ABSTRACT

This application discloses a sequence generating method and apparatus, and relates to the field of communications technologies, to resolve a problem that a PAPR of a DMRS symbol is higher than that of a data symbol. An initialization factor of a first sequence is obtained, where the initialization factor is associated with a first parameter, and the first sequence is generated based on the initialization factor. In addition, the first parameter is a port number, or the first parameter is a code division multiplexing CDM group identity.

15 Claims, 3 Drawing Sheets

Related U.S. Application Data continuation of application No. PCT/CN2019/117064, filed on Nov. 11, 2019.

(56) References Cited

U.S. PATENT DOCUMENTS

| | | | | |
|---|---|---|---|---|
| 11,632,204 | B2* | 4/2023 | Marinier | H04L 5/001 370/329 |
| 2015/0049704 | A1 | 2/2015 | Park et al. | |
| 2019/0044683 | A1 | 2/2019 | Wu et al. | |
| 2021/0242995 | A1* | 8/2021 | Noh | H04W 72/1273 |
| 2021/0266208 | A1* | 8/2021 | Liu | H04L 27/2614 |
| 2021/0315001 | A1* | 10/2021 | Matsumura | H04W 72/23 |
| 2021/0385038 | A1* | 12/2021 | Gao | H04L 5/0048 |

FOREIGN PATENT DOCUMENTS

| | | | | |
|---|---|---|---|---|
| CN | 108512642 | | 9/2018 | |
| JP | 6105582 | | 3/2017 | |
| JP | 6105582 | B2 * | 3/2017 | H04L 5/0035 |
| WO | 2018201986 | | 11/2018 | |
| WO | 2018202130 | | 11/2018 | |
| WO | WO-2018201986 | A1 * | 11/2018 | H04J 11/00 |

OTHER PUBLICATIONS

Ericsson, "On specification-based solutions to the DMRS PAPR issue," 3GPP TSG RAN WG1 Meeting #94-bis, R1-1811542, Chengdu, China, Oct. 8-12, 2018, 5 pages (Year: 2018).*

3GPP TS 38.211 V15.3.0, "3rd Generation Partnership Project; Technical Specification Group Radio Access Network; NR; Physical channels and modulation (Release 15)," Sep. 2018, 96 pages.

AT&T, "Remaining Issues of PAPR in NR," 3GPP TSG RAN WG1 Meeting #95, R1-1812851, Spokane, USA, Nov. 12-16, 2018, 14 pages.

Ericsson, "Benefits of Resource specific DMRS mapping," 3GPP TSG RAN WG1 Meeting #93, RI-1806231, Busan, Korea, May 21-25, 2018, 4 pages.

Ericsson, "Feature lead summary #3 of low PAPR RS," 3GPP TSG RAN WG1 Meeting #95, R1-1814109, Spokane, US, Nov. 12-16, 2018, 8 pages.

Ericsson, "Feature lead summary #4 of low PAPR RS," 3GPP TSG RAN WG1 Meeting #95, R1-1814203, Spokane, US, Nov. 12-16, 2018, 8 pages.

Ericsson, "Feature lead summary of low PAPR RS," 3GPP TSG RAN WG1 Meeting #95, R1-1814012, Spokane, US, Nov. 12-16, 2018, 17 pages.

Ericsson, "Further analysis of the PAPR issue of DMRS in Rel-15," 3GPP TSG RAN WG1 Meeting #93, R1-1806230, Busan, Korea, May 21-25, 2018, 4 pages.

Ericsson, "Further details of RS PAPR reduction," 3GPP TSG RAN WG1 Meeting #95, R1-1813262, Spokane, USA, Nov. 12-16, 2018, 8 pages.

Ericsson, "On specification-based solutions to the DMRS PAPR issue," 3GPP TSG RAN WG1 Meeting #94-bis, R1-1811542, Chengdu, China, Oct. 8-12, 2018, 5 pages.

Extended European Search Report issued in European Application No. 19883526.6 on Dec. 15, 2021, 9 pages.

Huawei et al., "Discussion on PAPR for CSI-RS and DMRS," 3GPP TSG RAN WG1 Meeting #94bis, R1-1810703, Chengdu, China, Oct. 8-12, 2018, 3 pages.

Huawei et al., "Simulation results for low PAPR Type 2 DMRS sequence," 3GPP TSG RAN WG1 Meeting #95, R1-1814087, Spokane, USA, Nov. 12-16, 2018, 2 pages.

Huawei, HiSilicon, "Discussion on PAPR for CSI-RS and DMRS," 3GPP TSG RAN WG1 #95, R1-1812688 Spokane, USA, Nov. 12-16, 2018, 6 pages.

Intel Corporation, "Low PAPR Reference Signals," 3GPP TSG RAN WG1 Meeting #95, R1-1813892, Spokane, USA, Nov. 12-16, 2018, 14 pages.

NEC, "Discussion on low PAPR RS," 3GPP TSG RAN WG1 Meeting #95, R1-1812657, Spokane, USA, Nov. 12-16, 2018, 4 pages.

Office Action in Chinese Appln. No. 201811348559.8, dated Apr. 22, 2023, 8 pages.

Office Action issued in Chinese Application No. 202011562909.8 on Feb. 14, 2022, 13 pages (with English translation).

Office Action issued in Chinese Application No. 202011562909.8 on Nov. 18, 2021, 6 pages.

Office Action issued in Japanese Application No. 2021-526281 on Jul. 5, 2022, 4 pages (with English translation).

OPPO, "Discussion on RS enhancement for PAPR reduction," 3GPP TSG-RAN WG1 Meeting #95, R1-18102808, Spokane, USA, Nov. 12-16, 2018, 4 pages.

OPPO, "Evaluation on DMRS for PAPR reduction," 3GPP TSG RAN WG1#95, R1-1812809, Spokane, USA, Nov. 12-16, 2018, 3 pages.

PCT International Search Report and Written Opinion in International Application No. PCT/CN2019/117064, dated Feb. 5, 2020, 20 pages.

Qualcomm Incorporated, "Lower PAPR reference signals," 3GPP TSG RAN WG1 Meeting #95, R1-1813445, Spokane, WA, USA, Nov. 12-16, 2018, 24 pages.

Qualcomm Incorporated, "Lower PAPR reference signals," 3GPP TSG RAN WG1 Meeting #95, R1-1813898, Spokane, USA, Nov. 12-16, 2018, 25 pages.

Vivo, "Discussion on low PAPR RS," 3GPP TSG RAN WG1 Meeting #95, R1-1812326, Spokane, USA, Nov. 12-16, 2018, 9 pages.

* cited by examiner

SEQUENCE GENERATING AND PROCESSING METHOD AND APPARATUS

CROSS-REFERENCE TO RELATED APPLICATIONS

This application is a continuation of U.S. patent application Ser. No. 17/318,644, filed on May 12, 2021, which is a continuation of International Application No. PCT/CN2019/117064, filed on Nov. 11, 2019, which claims priority to Chinese Patent Application No. 201811348559.8, filed on Nov. 13, 2018. All of the afore-mentioned patent applications are hereby incorporated by reference in their entireties.

TECHNICAL FIELD

The present invention relates to the field of mobile communications technologies, and specifically, to a sequence generating and processing method and apparatus.

BACKGROUND

In a multiple-input multiple-output (multi-input multi-output) system, each transmit antenna (for example, a logical antenna or a physical antenna) has an independent data channel. A receive end device (for example, a network device or a terminal) usually performs channel estimation on each transmit antenna based on a reference signal that is known in advance, and restores, based on a channel estimation result, a data signal transmitted through the data channel. Therefore, how to configure a reference signal or how to configure a sequence used to generate a reference signal is of vital importance. In a process of configuring the sequence for generating the reference signal, how to avoid interference also becomes an important problem that urgently needs to be resolved.

SUMMARY

Embodiments of this application provide a sequence generating and processing method and apparatus. The present invention provides a sequence generating and processing method and apparatus. The sequence generating and processing method and apparatus can effectively reduce a peak to average power ratio in a symbol sending process, and are particularly applicable to a scenario in which a reference signal is sent.

According to a first aspect, an embodiment of this application provides a sequence generating method, including: obtaining an initialization factor of a first sequence, where the initialization factor is associated with a first parameter; and generating the first sequence based on the initialization factor.

With reference to the first aspect, in a first possible design, the initialization factor satisfies:

$$c_{init} = \left(2^{17} f(\lambda) + 2N_{ID}^{g(\lambda, n_{SCID})} + g(\lambda, n_{SCID})\right) \bmod 2^{31}$$

where $f(\lambda, n_{SCID}) = \left(N_{symb}^{slot} n_{s,f}^{\mu} + l + 1\right)\left(2N_{ID}^{g(\lambda, n_{SCID})} + 1\right) + 2^d h(\lambda)$, $f(\lambda, n_{SCID}) = \left(N_{symb}^{slot} n_{s,f}^{\mu} + l + 2^d h(\lambda) + 1\right)\left(2N_{ID}^{g(\lambda, n_{SCID})} + 1\right)$, or $f(\lambda, n_{SCID}) = \left(N_{symb}^{slot} n_{s,f}^{\mu} + l + 1\right)\left(2N_{ID}^{g(\lambda, n_{SCID})} + 2^d h(\lambda) + 1\right);$ -continued $d$ satisfies: $d \in \{0, 1, 2, \ldots, 13\}$;

$\lambda$ is the first parameter, and $\lambda$ is one of $\lambda_1, \lambda_2,$ and $\lambda_3$;

$g(\lambda_1, n_{SCID}) = n_{SCID}$, and $h(\lambda_1) = 0$;

$g(\lambda_2, n_{SCID}) = 1 - n_{SCID}$, and $h(\lambda_2) = 0$;

$g(\lambda_3, n_{SCID}) = n_{SCID}$, and $h(\lambda_3) = 1$; or $g(\lambda_3, n_{SCID}) = 1 - n_{SCID}$, and $h(\lambda_3) = 1$; and $N_{symb}^{slot}$ is a quantity of symbols in a slot, $n_{s,f}^{\mu}$ is an index of a subframe or a slot, $l$ is an index of a symbol, $n_{SCID}$ is a scrambling factor, and $N_{ID}^{g(\lambda, n_{SCID})}$ is a sequence scrambling identity.

With reference to the first aspect or the first possible design of the first aspect, in a second possible design, $\lambda_1$ is 0, $\lambda_2$ is 1, and $\lambda_3$ is 2.

With reference to the first aspect, in a third possible design, the initialization factor satisfies:

$$c_{init} = (2^{17}(N_{symb}^{slot} n_{s,f}^{\mu} + l + 1)(2N_{ID}^{g(\lambda, n_{SCID})} + g(\lambda, n_{SCID}) + 2^{17} \lfloor \lambda/2 \rfloor) \bmod 2^{31}$$

where $N_{symb}^{slot}$ is a quantity of symbols in a slot, $n_{s,f}^{\mu}$ is an index of a subframe or a slot, 1 is an index of a symbol, $n_{SCID}$ is a scrambling factor, and $N_{ID}^{g(\lambda, n_{SCID})}$ is a sequence scrambling identity;

$\lambda$ is the first parameter, and is one of 0, 1, and 2; and
when $\lambda=0$, $g(\lambda, n_{SCID}) = n_{SCID}$;
when $\lambda=1$, $g(\lambda, n_{SCID}) = 1 - n_{SCID}$; or
when $\lambda=2$, $g(\lambda, n_{SCID}) = n_{SCID}$, or $g(\lambda, n_{SCID}) = 1 - n_{SCID}$.

With reference to the first aspect or the first to the third possible designs of the first aspect, in a fourth possible design, the first parameter is a port number; or the first parameter is a code division multiplexing CDM group identity.

With reference to the first aspect or the first to the fourth possible designs of the first aspect, in a fifth possible design, the method further includes receiving a first signaling, where the first signaling is used to indicate the first parameter.

With reference to the first aspect or the first to the fifth possible designs of the first aspect, in a sixth possible design, the method further includes:
generating a first reference signal based on the first sequence; and
sending the first reference signal.

With reference to the first aspect or the first to the fifth possible designs of the first aspect, in a seventh possible design, the method further includes:
receiving a second reference signal; and
processing the second reference signal based on the first sequence.

According to a second aspect, an embodiment of this application provides a sequence generating apparatus, including: a determining module, configured to obtain an initialization factor of a first sequence, where the initialization factor is associated with a first parameter; and a generation module, configured to generate the first sequence based on the initialization factor.

With reference to the second aspect, in a first possible design, the initialization factor satisfies:

$$c_{init} = \left(2^{17}f(\lambda) + 2N_{ID}^{g(\lambda,n_{SCID})} + g(\lambda, n_{SCID})\right) \bmod 2^{31}$$

where $f(\lambda, n_{SCID}) = \left(N_{symb}^{slot}n_{s,f}^{\mu} + l + 1\right)\left(2N_{ID}^{g(\lambda,n_{SCID})} + 1\right) + 2^d h(\lambda),$ $f(\lambda, n_{SCID}) = \left(N_{symb}^{slot}n_{s,f}^{\mu} + l + 2^d h(\lambda) + 1\right)\left(2N_{ID}^{g(\lambda,n_{SCID})} + 1\right),$ or $f(\lambda, n_{SCID}) = \left(N_{symb}^{slot}n_{s,f}^{\mu} + l + 1\right)\left(2N_{ID}^{g(\lambda,n_{SCID})} + 2^d h(\lambda) + 1\right);$ $d$ satisfies: $d \in \{0, 1, 2, \ldots, 13\}$;

$\lambda$ is the first parameter, and $\lambda$ is one of $\lambda_1, \lambda_2$, and $\lambda_3$;

$g(\lambda_1, n_{SCID}) = n_{SCID}$, and $h(\lambda_1) = 0$;

$g(\lambda_2, n_{SCID}) = 1 - n_{SCID}$, and $h(\lambda_2) = 0$;

$g(\lambda_3, n_{SCID}) = n_{SCID}$, and $h(\lambda_3) = 1$; or $g(\lambda_3, n_{SCID}) = 1 - n_{SCID}$, and $h(\lambda_3) = 1$; and $N_{symb}^{slot}$ is a quantity of symbols in a slot, $n_{s,f}^{\mu}$ is an index of a subframe or a slot, $l$ is an index of a symbol, $n_{SCID}$ is a scrambling factor, and $N_{ID}^{g(\lambda,n_{SCID})}$ is a sequence scrambling identity.

With reference to the second aspect or the first possible design of the second aspect, in a second possible design, $\lambda_1$ is 0, $\lambda_2$ is 1, and $\lambda_3$ is 2.

With reference to the second aspect, in a third possible design, the initialization factor satisfies:

$c_{init} = (2^{17}(N_{symb}^{slot}n_{s,f}^{\mu}+l+1)(2N_{ID}^{g(\lambda,n_{SCID})}+g(\lambda, n_{SCID})+2^{17}\lfloor \lambda/2 \rfloor) \bmod 2^{31}$ where $N_{symb}^{slot}$ is a quantity of symbols in a slot, $n_{s,f}^{\mu}$ is an index of a subframe or a slot, 1 is an index of a symbol, $n_{SCID}$ is a scrambling factor, and $N_{ID}^{g(\lambda,n_{SCID})}$ is a sequence scrambling identity;

$\lambda$ is the first parameter, and is one of 0, 1, and 2; and when $\lambda=0$, $g(\lambda, n_{SCID})=n_{SCID}$;

when $\lambda=1$, $g(\lambda, n_{SCID})=1-n_{SCID}$; or when $\lambda=2$, $g(\lambda, n_{SCID})=n_{SCID}$, or $g(\lambda, n_{SCID})=1-n_{SCID}$.

With reference to the second aspect or the first to the third possible designs of the second aspect, in a fourth possible design, the first parameter is a port number, or the first parameter is a code division multiplexing CDM group identity.

With reference to the second aspect or the first to the fourth possible designs of the second aspect, in a fifth possible design, the apparatus further includes:
 a receiving module, configured to receive first signaling, where the first signaling is used to indicate the first parameter.

With reference to the second aspect or the first to the fifth possible designs of the second aspect, in a sixth possible design, the apparatus further includes:
 the generation module, further configured to generate a first reference signal based on the first sequence; and
 a sending module, configured to send the first reference signal.

With reference to the second aspect or the first to the fifth possible designs of the second aspect, in a seventh possible design, the apparatus further includes:
 a receiving module, configured to receive a second reference signal; and
 a processing module, configured to process the second reference signal based on the first sequence.

According to a third aspect, an embodiment of this application provides a communications system, including a transmit end and a receive end. The transmit end is configured to perform the sixth possible design of the first aspect, and the receive end is configured to perform the seventh possible design of the first aspect.

According to a fourth aspect, this application further provides a processor and a memory that are associated with the foregoing aspects. The processor is configured to perform the methods according to the first aspect and the possible designs of the first aspect. The memory is configured to store programs corresponding to the first aspect and the possible designs of the first aspect.

In the embodiments of the present invention, through implementation of the foregoing aspects, there may be a plurality of initialization factors in a sequence generating process. Further, in the present invention, the initialization factor is designed, so that a parameter of the generated initialization factor is associated with a port number or a CDM group. In this way, a case in which a same sequence is used for different CDM groups can be avoided, and a problem that a PAPR of a DMRS symbol is higher than that of a data symbol is resolved.

BRIEF DESCRIPTION OF DRAWINGS

To describe the technical solutions in the embodiments of the present invention more clearly, the following briefly describes the accompanying drawings used in describing the embodiments.

DESCRIPTION OF EMBODIMENTS

Terms used in the implementation part of the present invention are merely intended to explain specific embodiments of the present invention, but are not intended to limit the present invention. The following clearly describes the technical solutions in the embodiments of the present invention with reference to the accompanying drawings in the embodiments of the present invention.

Figure 1:
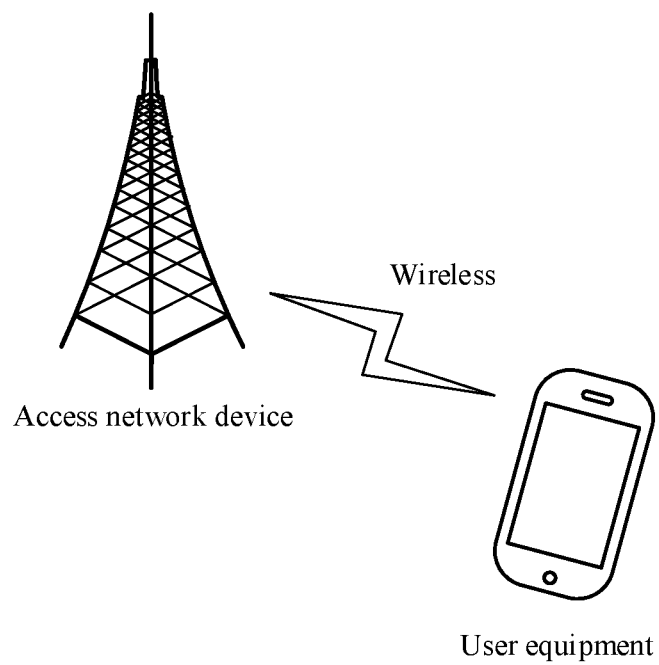
FIG. 1 is a schematic diagram of a communications system applicable to an embodiment of this application.

FIG. 1 is a schematic architectural diagram of a communications system according to an embodiment of the present invention. The communications system includes a transmit end device and a receive end device. An example in which the transmit end device is an access network device and the receive end device is user equipment (English: User Equipment, UE for short) is used for description in this embodiment of the present invention. The user equipment and the access network device communicate with each other by using an air interface technology. The air interface technology may include: an existing 2G (for example, global system for mobile communications (English: Global System for Mobile Communications, GSM for short)) system, 3G (for example, universal mobile telecommunications system (English: Universal Mobile Telecommunications System, UMTS for short), wideband code division multiple access (English: Wideband Code Division Multiple Access, WCDMA for short), and time division-synchronous code division multiple access (English: Time Division-Synchronous Code Division Multiple Access, TD-SCDMA for short)) system, and 4G (for example, FDD LTE or TDD LTE) system, and a new radio access technology (English: New Radio Access Technology, New RAT for short) system, for example, a 4.5G or 5G system.

A method described in the present invention may be executed by the user equipment or the access network device, or may be executed by a chip, a circuit, a storage device, or a computer program. In the present invention, the user equipment is described as UE in a general sense. In addition, the user equipment may also be referred to as a mobile station, an access terminal, a subscriber unit, a subscriber station, a remote station, a remote terminal, a mobile device, a user terminal, a terminal, a wireless communications device, a user agent, a user apparatus, or the like. The user equipment may be a cellular phone, a cordless phone, a session initiation protocol (English: Session Initiation Protocol, SIP for short) phone, a wireless local loop (English: Wireless Local Loop, WLL for short) station, a personal digital assistant (English: Personal Digital Assistant, PDA for short), a handheld device with a wireless communication function, a computing device, another processing device connected to a wireless modem, a vehicle-mounted device, a wearable device, a mobile station in a future 5G network, a terminal device in a future evolved public land mobile network (English: Public Land Mobile Network, PLMN for short), or the like. Moreover, in the embodiments of the present invention, the user equipment may further include a relay (English: Relay) and another device that can perform data communication with the access network device (for example, a base station).

The access network device described in the present invention may be a device configured to communicate with the user equipment. Specifically, in a wireless communications system, the access network device is a device that communicates with the user equipment in a wireless manner. For example, the access network device may be a base transceiver station (English: Base Transceiver Station, BTS for short) in a GSM system, may be an NB (English: NodeB) in a WCDMA system, or may be an evolved NodeB (English: evolved Node B, eNB for short) in LTE, a relay station, a vehicle-mounted device, a wearable device, an access network device in the future 5G network, an access network device in the future evolved PLMN network, or the like.

Figure 2:
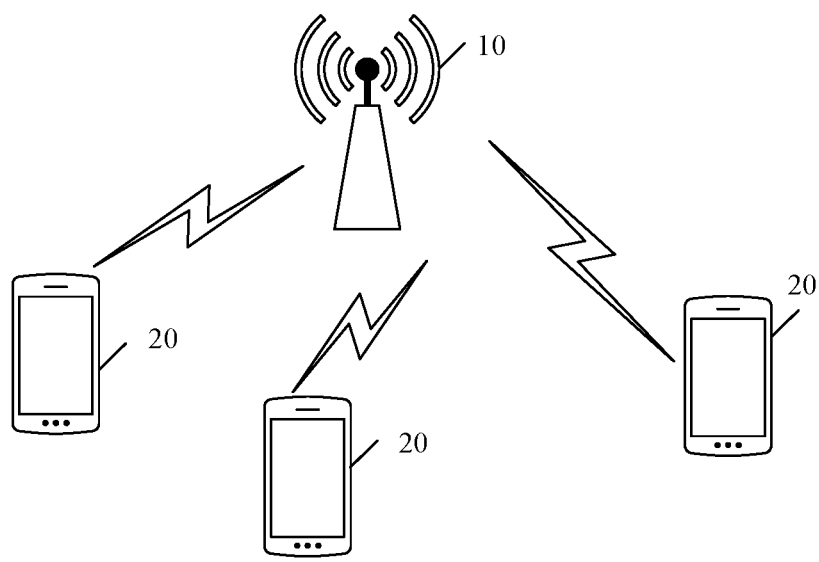
FIG. 2 is a schematic diagram of another communications system applicable to an embodiment of this application.

Technical solutions provided in the embodiments of this application may be applied to various communications systems. FIG. 2 is a schematic diagram of another communications system according to an embodiment of the present invention.

FIG. 2 is a schematic diagram of a communications system applicable to an embodiment of this application. The communications system may include one or more network devices 10 (only one network device is shown) and one or more terminals 20 connected to each network device 10. FIG. 2 is merely a schematic diagram, and does not constitute a limitation on an applicable scenario of the technical solutions provided in this application. A device for performing the implementations of the present invention may be the network device 10, or may be one or more terminals 20. The network device 10 and the one or more terminals 20 may be applicable to an uplink scenario and a downlink scenario.

The network device 10 may be a transmission reception point (transmission reception point, TRP), a base station, a relay station, an access point, or the like. The network device 10 may be a network device in a 5G communications system or a network device in a future evolved network; or may be a wearable device, a vehicle-mounted device, or the like. In addition, the network device 10 may alternatively be a base transceiver station (base transceiver station, BTS) in a global system for mobile communications (global system for mobile communication, GSM) or a code division multiple access (code division multiple access, CDMA) network, may be an NB (NodeB) in a wideband code division multiple access (wideband code division multiple access, WCDMA), or may be an eNB or eNodeB (evolutional NodeB) in long term evolution (long term evolution, LTE). The network device 10 may alternatively be a radio controller in a cloud radio access network (cloud radio access network, CRAN) scenario.

The terminal 20 may be user equipment (user equipment, UE), an access terminal, a UE unit, a UE station, a mobile station, a mobile station, a remote station, a remote terminal, a mobile device, a UE terminal, a wireless communications device, a UE agent, a UE apparatus, or the like. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device, another processing device connected to a wireless modem, a vehicle-mounted device, a wearable device, a terminal in a 5G network, a terminal in a future evolved public land mobile network (public land mobile network, PLMN) network, or the like.

Optionally, each network element (for example, the network device 10 and the terminals 20) in FIG. 2 may be implemented by one device, may be jointly implemented by a plurality of devices, or may be a function module in a device. This is not specifically limited in this embodiment of this application. It may be understood that the foregoing function may be a function of a network element in a hardware device, may be a software function running on dedicated hardware, or may be a virtualization function instantiated on a platform (for example, a cloud platform).

Figure 3:
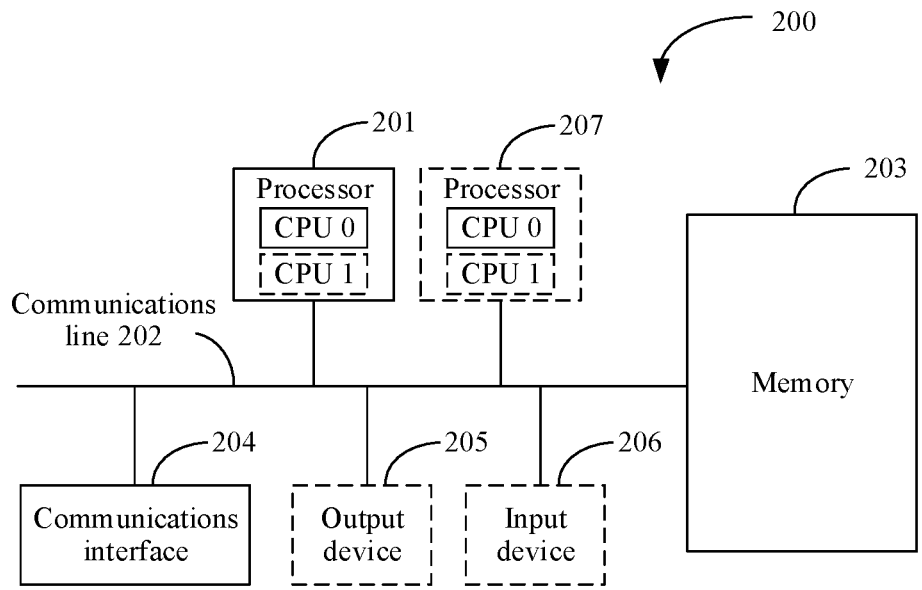
FIG. 3 is a schematic diagram of a hardware structure of a communications device applicable to an embodiment of this application.

For example, each network element in FIG. 2 may be implemented by using a communications device 200 in FIG. 3. FIG. 3 is a schematic diagram of a hardware structure of a communications device applicable to an embodiment of this application. The communications device 200 includes at least one processor 201, a communications line 202, a memory 203, and at least one communications interface 204.

The processor 201 may be a general-purpose central processing unit (central processing unit, CPU), a microprocessor, an application-specific integrated circuit (application-specific integrated circuit, ASIC), or one or more integrated circuits configured to control program execution in the solutions in this application.

The communications line 202 may include a path for transmitting information between the foregoing components.

The communications interface 204 may be implemented by using any apparatus such as a transceiver, and is configured to communicate with another device or a communications network, such as Ethernet, a RAN, or a wireless local area network (wireless local area networks, WLAN).

The memory 203 may be a read-only memory (read-only memory, ROM) or another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 203 is not limited thereto. The memory may exist independently, and is connected to the processor by using the communications line 202. Alternatively, the memory may be integrated with the processor. The memory provided in this embodiment of this application may usually be non-volatile. The memory 203 is configured to store a computer-executable instruction for executing the solutions in this application, and the processor 201 controls the execution. The processor 201 is configured to execute the computer-executable instruction stored in the memory 203, to implement a method provided in the following embodiment of this application.

Optionally, the computer-executable instruction in this embodiment of this application may also be referred to as application program code. This is not specifically limited in this embodiment of this application.

During specific implementation, in an embodiment, the processor 201 may include one or more CPUs, for example, a CPU 0 and a CPU 1 in FIG. 3.

During specific implementation, in an embodiment, the communications device 200 may include a plurality of processors, for example, the processor 201 and a processor 207 in FIG. 3. Each one of the processors may be a single-core (single-CPU) processor, or may be a multi-core (multi-CPU) processor. The processor herein may refer to one or more devices, circuits, and/or processing cores configured to process data (for example, a computer program instruction).

During specific implementation, in an embodiment, the communications device 200 may further include an output device 205 and an input device 206. The output device 205 communicates with the processor 201, and may display information in a plurality of manners. For example, the output device 205 may be a liquid crystal display (liquid crystal display, LCD), a light emitting diode (light emitting diode, LED) display device, a cathode ray tube (cathode ray tube, CRT) display device, a projector (projector), or the like. The input device 206 communicates with the processor 201, and may receive an input from a user in a plurality of manners. For example, the input device 206 may be a mouse, a keyboard, a touchscreen device, a sensing device, or the like.

The foregoing communications device 200 may be a general-purpose device or a dedicated device. During specific implementation, the communications device 200 may be a desktop computer, a portable computer, a network server, a personal digital assistant (personal digital assistant, PDA), a mobile phone, a tablet computer, a wireless terminal device, an embedded device, or a device having a structure similar to that in FIG. 3. A type of the communications device 200 is not limited in this embodiment of this application.

It should be noted that any technical solution provided in the embodiments of this application may be applied to a downlink transmission scenario, or may be applied to an uplink transmission scenario. When the solution is applied to a downlink transmission scenario, a transmit end device may be a network device, and a receive end device may be a terminal. When the solution is applied to an uplink transmission scenario, a transmit end device may be a terminal, and a receive end device may be a network device. In any one of the following embodiments, after the transmit end device (or the receive end device) is replaced with a network device, a network device in this embodiment and the network device that the transmit end device (or the receive end device) is replaced with may represent a same network device. After the transmit end device (or the receive end device) is replaced with a terminal, a terminal in this embodiment and the terminal that the transmit end device (or the receive end device) is replaced with may represent a same terminal. This is uniformly described herein, and details are not described below again.

A "resource unit" in the embodiments of this application is a basic unit for scheduling a terminal. The resource unit includes a plurality of contiguous subcarriers in frequency domain and one time interval (time interval, TI) in time domain. In different scheduling processes, sizes of resource units may be the same or may be different. The TI may be a transmission time interval (transmission time interval, TTI) in an LTE system, may be a symbol-level short TTI or a short TTI in a high frequency system with a large subcarrier, or may be a slot (slot) or a mini-slot (mini-slot) in a 5G system. This is not limited in the embodiments of this application. Optionally, one resource unit may include one or more RBs, one or more RB pairs (RB pair), and the like. In addition, the resource unit may alternatively be half an RB or the like. In addition, the resource unit may be another time-frequency resource. This is not limited in the embodiments of this application. It should be noted that, unless otherwise specified, or when no conflict exists, the following specific examples are all described by using an example in which the resource unit is an RB in the LTE system.

A "scheduling periodicity" in the embodiments of this application is a time interval TI.

A "time-domain symbol" in the embodiments of this application may include but is not limited to any one of the following: an OFDM symbol, a universal filtered multicarrier (universal filtered multi-carrier, UFMC) signal, a filter-bank multi-carrier (filter-bank multi-carrier, FBMC) symbol, a generalized frequency division multiplexing (generalized frequency-division multiplexing, GFDM) symbol, and the like.

The term "at least one (type)" in the embodiments of this application includes one (type) or more (types). "A plurality of (types)" means two (types) or more than two (types). For example, at least one of A, B, and C includes the following cases: Only A exists, only B exists, both A and B exist, both A and C exist, both B and C exist, and all of A, B, and C exist. The term "and/or" in the embodiments of this application is merely an association relationship for describing associated objects and represents that three relationships may exist. For example, A and/or B may represent the following three cases: Only A exists, both A and B exist, and only B exists. The term character "/" in the embodiments of this application generally indicates an "or" relationship between associated objects. In addition, in a formula, the character "/" indicates a division relationship between the associated objects. For example, A/B may indicate that A is divided by B. The terms "first", "second", and the like in the embodiments of this application are intended to distinguish between different objects but do not indicate an order of the different objects.

The following describes the technical solutions provided in the embodiments of this application with reference to the accompanying drawings.

Figure 4:
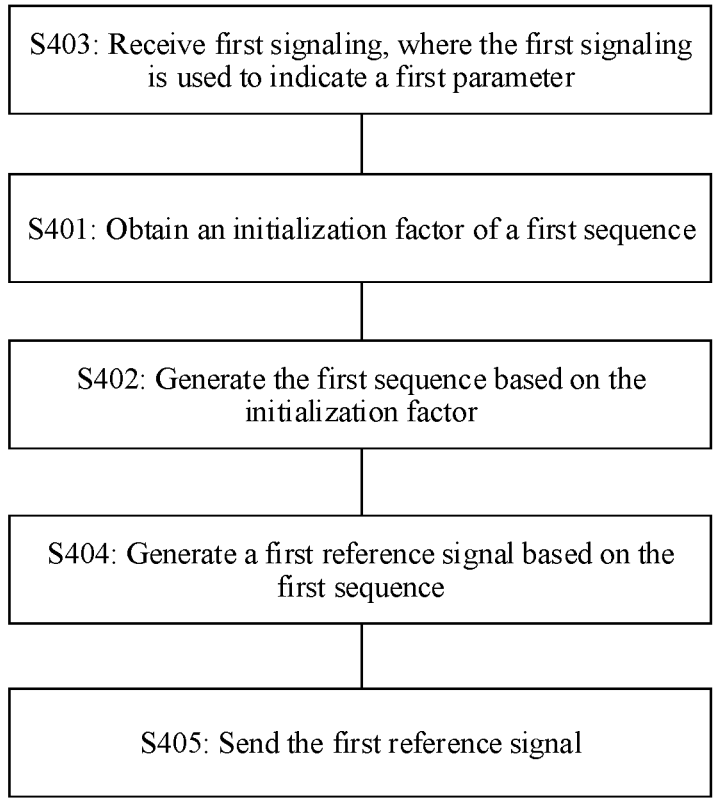
FIG. 4 is a schematic diagram of a sequence generating method according to an embodiment of this application.

FIG. 4 is a schematic diagram of a sequence generating method according to an embodiment of this application. The method includes the following steps.

S401: Obtain an initialization factor of a first sequence, where the initialization factor is associated with a first parameter.

S402: Generate the first sequence based on the initialization factor.

With reference to the foregoing description, steps S401 and S402 may be performed by a network device, or may be performed by a terminal. In a communications system, the two steps may alternatively be performed by both the network device and the terminal. In a case of uplink and downlink data transmission, the foregoing steps may be performed for a plurality of times by one network device or terminal. For example, in an uplink transmission process, a sequence generating method is performed once for a sequence of an uplink signal. Before or after the performing, the method is performed once again for generating a sequence of a downlink signal. In an embodiment, the first sequence is a sequence for generating a reference signal. The reference signal may be but is not limited to a demodulation reference signal (demodulation reference signal, DMRS), or may be another reference signal used for demodulation.

In an embodiment, the initialization factor is associated with the first parameter. The first parameter may be specifically a system parameter, for example, a port number or a code division multiplexing (code division multiplexing, CDM) group identity. The port herein is usually an antenna port, or may be a port in another form, for example, a physical port of an antenna. Optionally, the first parameter may alternatively be another parameter, for example, a parameter such as an antenna panel identity or another identity.

In an embodiment, the method may further include:
S401A: Determine a first parameter, and obtain an initialization factor of a first sequence based on the first parameter. For example, when the antenna port is the first parameter, S401A is as follows: Determine an antenna port, and obtain an initialization factor of a first sequence based on the antenna port. Alternatively, when the CDM group identity is the first parameter, S401A is as follows: Determine a CDM group identity, and obtain an initialization factor of a first sequence based on the CDM group identity. It should be understood that the CDM group identity may alternatively be other information about the CDM group. For example, another parameter that can be used to determine group information of the CDM group is obtained. The parameter may be used to determine the group information or the group identity that is of the CDM group in an implicit or explicit manner, or based on a preset correspondence. The parameter is the first parameter.

The following gives specific examples for description according to the foregoing method.

Example 1

The First Parameter is a CDM Group Identity

For a CDM group identity of a CDM group to which a reference signal corresponding to the first sequence belongs is obtained, the first sequence may be used to generate the reference signal to demodulate data corresponding to the CDM group. Therefore, correspondingly, a process of obtaining the initialization factor of the first sequence is also determined by the CDM group identity. For example, the CDM group identity may be 0, 1, or 2. In this case, a manner of generating the initialization factor may have different functions based on the CDM group identity. For example, the initialization factor satisfies:

$$c_{init} = \left(2^{17} f(\lambda) + 2N_{ID}^{g(\lambda, n_{SCID})} + g(\lambda, n_{SCID})\right) \mod 2^{31}$$

where $f(\lambda, n_{SCID}) = \left(N_{symb}^{slot} n_{s,f}^{\mu} + l + 1\right)\left(2N_{ID}^{g(\lambda, n_{SCID})} + 1\right) + 2^d h(\lambda)$, $f(\lambda, n_{SCID}) = \left(N_{symb}^{slot} n_{s,f}^{\mu} + l + 2^d h(\lambda) + 1\right)\left(2N_{ID}^{g(\lambda, n_{SCID})} + 1\right)$, or $f(\lambda, n_{SCID}) = \left(N_{symb}^{slot} n_{s,f}^{\mu} + l + 1\right)\left(2N_{ID}^{g(\lambda, n_{SCID})} + 2^d h(\lambda) + 1\right);$ $d$ satifies: $d \in \{0, 1, 2, \ldots, 13\};$ $\lambda$ is the first parameter, and $\lambda$ is a CDM group identity and may be specifically one of 0, 1, and 2; and when $\lambda = 0$, $g(\lambda, n_{SCID}) = n_{SCID}$;

when $\lambda = 1$, $g(\lambda, n_{SCID}) = 1 - n_{SCID}$; or when $\lambda = 2$, $g(\lambda, n_{SCID}) = n_{SCID}$, or $g(\lambda, n_{SCID}) = 1 - n_{SCID}$.

It should be understood that for different 2, the foregoing three branches that initialization factors satisfy may be predefined at a receive end and a transmit end by using a correspondence or in a form of a table.

In an example, $h(\lambda)$ may be $\lfloor \lambda/2 \rfloor$, which represent rounding down $\lambda/2$.

$N_{symb}^{slot}$ is a quantity of symbols in a slot, $n_{s,f}^{\mu}$ is an index of a subframe or a slot, l is an index of a symbol, $n_{SCID}$ is a scrambling factor, and $N_{ID}^{g(\lambda, n_{SCID})}$ is a sequence scrambling identity.

In an example, if d=0, the foregoing initialization factor satisfies:

$c_{init} = (2^{17}(N_{symb}^{slot} n_{s,f}^{\mu} + l + 1)(2N_{ID}^{g(\lambda, n_{SCID})} + g(\lambda, n_{SCID}) + 2^{17} \lfloor \lambda/2 \rfloor) \mod 2^{31}$; and more specifically, when $\lambda = 0$, the foregoing initialization factor satisfies:

$c_{init} = (2^{17}(N_{symb}^{slot} n_{s,f}^{\mu} + l + 1)(2N_{ID}^{n_{SCID}} + 1) + 2N_{ID}^{n_{SCID}} + n_{SCID} + 2^{17} \lfloor \lambda/2 \rfloor) \mod 2^{31}$;

more specifically, when $\lambda = 1$, the foregoing initialization factor satisfies:

$c_{init} = (2^{17}(N_{symb}^{slot} n_{s,f}^{\mu} + l + 1)(2N_{ID}^{1-n_{SCID}} + 1) + 2N_{ID}^{1-n_{SCID}} + 1 - n_{SCID} + 2^{17} \lfloor \lambda/2 \rfloor) \mod 2^{31}$; or more specifically, when $\lambda = 2$, the foregoing initialization factor satisfies:

$$c_{init} = \left(2^{17}\left(N_{symb}^{slot} n_{s,f}^{\mu} + l + 1\right)\left(2N_{ID}^{g(\lambda, n_{SCID})} + 1\right) + 2N_{ID}^{g(\lambda, n_{SCID})} + g(\lambda, n_{SCID}) + 2^{17} \lfloor \lambda/2 \rfloor\right) \mod 2^{31}, \text{ or}$$

$c_{init} =$ $\left(2^{17}\left(N_{symb}^{slot} n_{s,f}^{\mu} + l + 1\right)\left(2N_{ID}^{1-n_{SCID}} + 1\right) + 2N_{ID}^{1-n_{SCID}} + 1 - n_{SCID} + 2^{17} \lfloor \lambda/2 \rfloor\right)$ $\mod 2^{31}.$ $N_{symb}^{slot}$ is a quantity of symbols in a slot, for example, but not limited to, a quantity of symbols in a slot that carries the reference signal. For example, in the LTE standard, $N_{symb}^{slot}$ may be equal to 6 or 7, or may be 10. In NR, $N_{symb}^{slot}$ may be variable, or may be a fixed value. $n_{s,f}^{\mu}$ is an index of a subframe or a slot, for example, but not limited to, an index of a subframe that carries the reference signal. Alternatively, $n_{s,f}^{\mu}$ is an index of a slot, for example, but not limited to, an index of a slot that carries the reference signal. 1 is an index of a symbol, for example, but not limited to, an index of a symbol that carries the reference signal. For example, in the LTE standard, 1 may be equal to 0 to 5 or 0 to 6; in the NR, a value range of 1 may be 0 to 13. $n_{SCID}$ is a scrambling factor. For example, a value of $n_{SCID}$ may be 0 or 1. $N_{ID}^{g(\lambda,n_{SCID})}$ is a sequence scrambling identity. The slot herein may alternatively be a time unit. In an extended embodiment, the slot may alternatively be replaced with a quantity of slots in a subframe.

In an embodiment, when λ=2, an expression that the initialization factor satisfies may be λ=0 or λ=1.

Example 2

The First Parameter is a Port Identity

A first parameter value may be determined based on different port identities. For example, because there is the following correspondence (Table 1) between a port identity and a CDM group identity, an initialization factor may alternatively be directly determined based on the following p value:

TABLE 1

| p | CDM group λ |
| --- | --- |
| 1000 | 0 |
| 1001 | 0 |
| 1002 | 1 |
| 1003 | 1 |
| 1004 | 2 |
| 1005 | 2 |
| 1006 | 0 |
| 1007 | 0 |
| 1008 | 1 |
| 1009 | 1 |
| 1010 | 2 |
| 1011 | 2 |

For example, when p is 1000 and 1001, it is directly determined that the initialization factor is the following formula or satisfies the following formula:

$c_{init}=(2^{17}(N_{symb}^{slot}n_{s,f}^{\mu}+1+1)(2N_{ID}^{g(\lambda,n_{SCID})}+g(\lambda, n_{SCID})+2^{17}\lfloor\lambda/2\rfloor)\bmod 2^{31}$;

When p is 1002 and 1003, it is directly determined that the initialization factor is the following formula or satisfies the following formula:

$c_{init}=(2^{17}(N_{symb}^{slot}n_{s,f}^{\mu}+1+1)(2N_{ID}^{nSCID}+1)+2N_{ID}^{nSCID}+n_{SCID}+2^{17}\lfloor\lambda/2\rfloor)\bmod 2^{31}$;

where other p values may correspond to values of the CDM group, and details are not described herein again.

Example 3

The First Parameter is Another Identity

For example, the CDM group may be usually determined in a manner of implicit notification through signaling. For example, a mapping relationship is defined, where a state indicated by signaling corresponds to a port value, and the CDM group identity is further determined based on Table 1. In a process of determining the initialization factor, the initialization factor may be determined and generated directly based on the signaling, both a sender and a receiver of the signaling may determine the initialization factor according to the implementation.

The foregoing three examples describe examples of the first parameter. It should be understood that the first parameter in the present invention is limited to the foregoing several identities.

In an embodiment, the initialization factor satisfies:

$$c_{init} = \left(2^{17} f(\lambda) + 2N_{ID}^{g(\lambda,n_{SCID})} + g(\lambda, n_{SCID})\right) \bmod 2^{31}$$

where $f(\lambda, n_{SCID}) = \left(N_{symb}^{slot} n_{s,f}^{\mu} + l + 1\right)\left(2N_{ID}^{g(\lambda,n_{SCID})} + 1\right) + 2^d h(\lambda)$, $f(\lambda, n_{SCID}) = \left(N_{symb}^{slot} n_{s,f}^{\mu} + l + 2^d h(\lambda) + 1\right)\left(2N_{ID}^{g(\lambda,n_{SCID})} + 1\right)$, or $f(\lambda, n_{SCID}) = \left(N_{symb}^{slot} n_{s,f}^{\mu} + l + 1\right)\left(2N_{ID}^{g(\lambda,n_{SCID})} + 2^d h(\lambda) + 1\right)$;

$d$ satisfies: $d \in \{0, 1, 2, \ldots, 13\}$;

λ is the first parameter, and λ is one of $\lambda_1$, $\lambda_2$, and $\lambda_3$;

$g(\lambda_1, n_{SCID}) = n_{SCID}$, and $h(\lambda_1) = 0$;

$g(\lambda_2, n_{SCID}) = 1 - n_{SCID}$, and $h(\lambda_2) = 0$;

$g(\lambda_3, n_{SCID}) = n_{SCID}$, and $h(\lambda_3) = 1$; or $g(\lambda_3, n_{SCID}) = 1 - n_{SCID}$, and $h(\lambda_3) = 1$; and $N_{symb}^{slot}$ is a quantity of symbols in a slot, $n_{s,f}^{\mu}$ is an index of a subframe or a slot, $l$ is an index of a symbol, $n_{SCID}$ is a scrambling factor, and $N_{ID}^{g(\lambda,n_{SCID})}$ is a sequence scrambling identity.

In an embodiment, $\lambda_1$ is 0, $\lambda_2$ is 1, and $\lambda_3$ is 2.

In an embodiment, the initialization factor satisfies: ti $c_{init}=(2^{17}(N_{symb}^{slot}n_{s,f}^{\mu}+1+1)(2N_{ID}^{g(\lambda,n_{SCID})}+g(\lambda, n_{SCID})+2^{17}\lfloor\lambda/2\rfloor)\bmod 2^{31}$ where $N_{symb}^{slot}$ is a quantity of symbols in a slot, $n_{s,f}^{\mu}$ is an index of a subframe or a slot, 1 is an index of a symbol, $n_{SCID}$ is a scrambling factor, and $N_{ID}^{g(\lambda,n_{SCID})}$ is a sequence scrambling identity;

λ is the first parameter, and is one of 0, 1, and 2; and when λ=0, $g(\lambda, n_{SCID})=n_{SCID}$;

when λ=1, $g(\lambda, n_{SCID})=1-n_{SCID}$; or when λ=2, $g(\lambda, n_{SCID})=n_{SCID}$, or $g(\lambda, n_{SCID})=1-n_{SCID}$.

In an embodiment, the first parameter is a port number; or the first parameter is a code division multiplexing CDM group identity.

It should be understood that, merely for ease of description, parameter values are added in the foregoing equations and expressions, and may also be different in expression. For example, $g(\lambda, n_{SCID})$ may be directly written as $g(n_{SCID})$ or g. Other parameters are similar to $g(\lambda, n_{SCID})$.

In an embodiment, the foregoing steps further include S403: Receive first signaling, where the first signaling is used to indicate the first parameter. In another embodiment, the foregoing steps further include S403A (not shown): Send first signaling, where the first signaling is used to indicate the first parameter.

In an embodiment, the method further includes: S404: Generate a first reference signal based on the first sequence; and S405: Send the first reference signal.

For example, a reference signal may be generated in the following manner:

obtaining a reference signal sequence, where the reference signal sequence may be generated according to the following formula:

$$r(n) = \frac{1}{\sqrt{2}}(1-2\cdot c(2n)) + j\frac{1}{\sqrt{2}}(1-2\cdot c(2n+1))$$

In this case, the reference signal sequence may alternatively be obtained by using a lookup table obtained based on the foregoing formula, where $c(n)=(x_1(n+N_c)+x_2(n+N_c))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$ $c(n)$ is a binary Gold sequence, and a length thereof may be, for example, but is not limited to, $M_{PN}$, where n=0, 1, . . . , $M_{PN}$−1, $N_c$=1600.

An initialization factor of $x_1(n)$ is: $x_1(0)=1$, $x_1(n)=0, n=1, 2, \ldots, 30$.

An initialization factor of $x_2(n)$ satisfies:

$$c_{init} = \sum_{i=0}^{30} x_2(i)\cdot 2^i.$$

$C_{init}$ herein may be in various forms satisfying the foregoing embodiments, or may be directly generated according to the formulas or equivalent variants of the formulas in the foregoing embodiments. In a specific implementation process, the reference signal is a DMRS or a CSI-RS.

It should be understood that, after the foregoing reference signal sequence is generated, if a process is a reference signal sending process, the reference signal sequence may be further mapped to subcarriers. In an embodiment, the foregoing subcarriers are equally spaced or contiguous subcarriers. Correspondingly, if a process is a receiving process, the process may be a demodulation process that is after a reference signal is received, and the foregoing process may further include channel estimation (that is, the foregoing processing step may be a channel estimation step). Details are not described herein again.

The obtaining a reference signal sequence may be in various manners, for example, but not limited to, obtaining the reference signal sequence through calculation according to a preset formula, or obtaining the reference signal sequence through table lookup. More specifically, the preset formula is, for example, but not limited to, a reference signal sequence generating formula. The formula is a formula related to the initialization factor. For example, a parameter in the preset formula includes the initialization factor. However, the relationship is not limited thereto. In a specific implementation process, for the foregoing preset formula, refer to, for example, but not limited to, a reference signal sequence generating formula mentioned in an existing LTE standard or 5G standard. In addition, as described in this specification, $n_{CDM\_m}$ represents an index of a code division multiplexing group to which an antenna port corresponding to the reference signal belongs, an offset value corresponding to the code division multiplexing group, a scrambling factor corresponding to the code division multiplexing group, or other information that can be used to identify the code division multiplexing group.

It should be understood that steps in each embodiment of the present invention may be separately used as an embodiment. In another embodiment, an association relationship between the first parameter and the initialization factor may be stored.

According to implementation of the foregoing method, there may be a plurality of initialization factors in a sequence generating process. Further, in the present invention, the initialization factor is designed, so that a parameter of the generated initialization factor is associated with a port number or a CDM group. In this way, a case in which a same sequence is used for different CDM groups can be avoided, and a problem that a PAPR of a DMRS symbol is higher than that of a data symbol is resolved. In an embodiment:

The following initialization factor is used for a type 2 DMRS sequence:

$$c_{init} = \left(2^{17}\left(N_{symb}^{slot}n_{s,f}^{\mu}+l+1\right)\left(2N_{ID}^{n_{SCID}(\lambda)}+1\right)+\right.$$
$$\left.2N_{ID}^{n_{SCID}(\lambda)}+n_{SCID}(\lambda)+2^{17}\text{ floor}\left(\frac{\lambda}{2}\right)\right)\mod 2^{31}$$

□ when $\lambda = 0$, $n_{SCID}(\lambda) + 2^{17}\text{ floor}\left(\frac{\lambda}{2}\right) = n_{SCID}$;

□ when $\lambda = 1$, $n_{SCID}(\lambda) + 2^{17}\text{ floor}\left(\frac{\lambda}{2}\right) = 1 - n_{SCID}$; or □ when $\lambda = 2$, $n_{SCID}(\lambda) + 2^{17}\text{ floor}\left(\frac{\lambda}{2}\right) = n_{SCID} + 2^{17}$.

Figure 5:
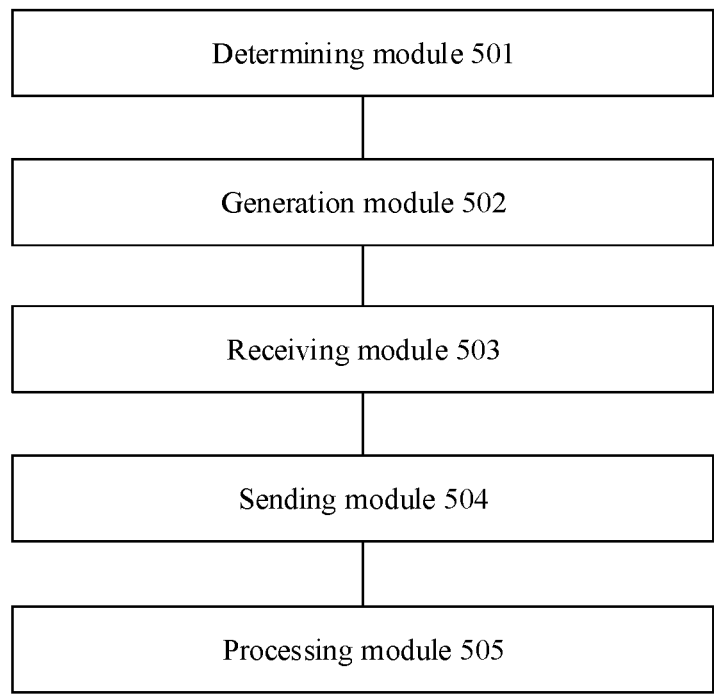
FIG. 5 is a schematic structural diagram of a sequence generating apparatus according to an embodiment of this application.

FIG. 5 is a schematic structural diagram of a sequence generating apparatus according to an embodiment of this application, where the sequence generating apparatus includes:

a determining module 501, configured to obtain an initialization factor of a first sequence, where the initialization factor is associated with a first parameter; and a generation module 502, configured to generate the first sequence based on the initialization factor.

For obtaining, by the determining module 501, the initialization factor of the first sequence; and generating, by the generation module 502, the first sequence based on the initialization factor, refer to the steps in the embodiment shown in FIG. 4. For example, the determining module may perform step S401, or may perform step 401A and other steps such as generating a reference signal, and details are not described herein again.

The apparatus may further include a receiving module 503, configured to receive first signaling, where the first signaling is used to indicate the first parameter. The module may perform step S403, and details are not described herein again. The receiving module is further configured to receive a second reference signal.

The apparatus may further include: a sending module 504, configured to send a first reference signal. The apparatus may further include a processing module 505, configured to process the second reference signal based on the first sequence.

Some or all of the foregoing modules may be a same module. For example, the generation module, the determining module, and the processing module may be an entire processing module. This embodiment of the present invention also protects integration of the modules and division into a plurality of modules to implement a function of a module. For the functions in this embodiment, refer to various possible designs in the foregoing aspects.

Figure 6:
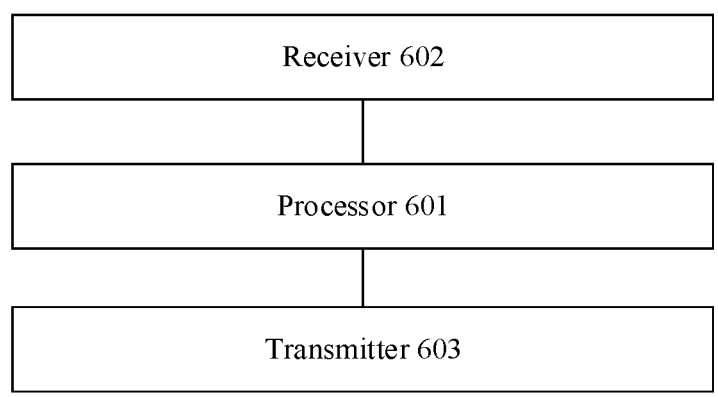
FIG. 6 is a schematic structural diagram of a sequence generating apparatus according to an embodiment of this application.

With reference to the example in FIG. 2, the foregoing apparatuses may be in a form shown in FIG. 6.

A processor 601 is configured to obtain an initialization factor of a first sequence, where the initialization factor is associated with a first parameter.

The processor 601 is configured to generate the first sequence based on the initialization factor. The processor may further perform functions of the foregoing processing module and determining module.

The receiving module may be a receiver 602, and the sending module may be a transmitter 603. In an embodiment, the transmitter and the receiver may be an antenna, a set of circuit devices, or transceiver pins of a chip.

The present invention further provides a communications system, including the foregoing transceiver apparatuses, to complete uplink and downlink transmission of a signal. For example, after generating a first sequence, the transmit end generates a first reference signal based on the first sequence and sends the first reference signal; and the receive end receives a second reference signal and processes the second reference signal based on the first sequence.

The present invention further provides a chip. The foregoing chip may be a processor, or may include the foregoing receiver and transmitter.

The present invention further provides a computer program, to perform the methods according to the foregoing embodiments.

To better implement the embodiments of the present invention, an embodiment of the present invention further provides a computer-readable storage medium. The computer-readable storage medium stores one or more computer programs. The computer-readable storage medium may be a magnetic disk, an optical disc, a ROM, a RAM, or the like. The one or more computer programs are run on one or more processors in a transmit end device. When the computer programs are run, a procedure corresponding to the transmit end device in the method embodiment shown in FIG. 4 may be implemented. The one or more computer programs are run on one or more processors in a receive end device. When the computer programs are run, a procedure corresponding to the receive end device in the method embodiment shown in FIG. 4 may be implemented.

Although the present invention is described herein with reference to the embodiments, a scope of the claims of the present invention shall not be limited thereto. In a process of implementing the present invention that claims protection, a person skilled in the art may understand and implement all or a part of the processes in the foregoing embodiments by viewing the accompanying drawings, the disclosed content, and the accompanying claims. Equivalent modifications made in accordance with the claims of the present invention still fall within the scope of the present invention. In the claims, "comprising" does not exclude another component or another step, and "a" or "one" does not exclude a case of "a plurality of". A single controller or another unit may implement several functions enumerated in the claims. Some measures are recorded in dependent claims that are different from each other, but this does not mean that these measures cannot be combined to produce a better effect. The computer program may be stored/distributed in a proper medium, for example, an optical storage medium or a solid state medium, and is provided together with other hardware or used as a part of hardware, or may be distributed in another manner, such as by using the Internet (English: Internet) or another wired or wireless system.

The invention claimed is:

1. A sequence generating method, comprising:
receiving a first reference signal from a communications device;
determining an initialization factor, $c_{init}$, wherein the initialization factor satisfies:

$$c_{init} = \left(2^{17}\left(N_{symb}^{slot}n_{s,f}^{\mu} + l + 1\right)\left(2N_{ID}^{g(\lambda,n_{SCID})} + 1\right) + 2N_{ID}^{g(\lambda,n_{SCID})} + g(\lambda, n_{SCID}) + 2^{17}\lfloor \lambda/2 \rfloor\right) \mod 2^{31},$$

where $N_{symb}^{slot}$ is a quantity of symbols in a slot, $n_{s,f}^{\mu}$ is an index of a subframe or a slot, l is an index of a symbol, $n_{SCID}$ is a scrambling factor, and $N_{ID}^{g(\lambda,n_{SCID})}$ is a sequence scrambling identity, $\lambda$ is a parameter with a value of 0, 1, or 2, and $g(\lambda, n_{SCID})$ is a function that satisfies:

$g(\lambda, n_{SCID}) = n_{SCID}$, when $\lambda = 0$ or 2; or $g(\lambda, n_{SCID}) = 1 - n_{SCID}$, when $\lambda = 1$ processing the first reference signal based on the initialization factor.

2. The method according to claim 1, wherein the parameter is a port number or a code division multiplexing (CDM) group identity.

3. The method according to claim 1, wherein the method further comprises:
sending first signaling that indicates the parameter to the communications device.

4. An apparatus, comprising:
at least one processor coupled to a memory device that stores programming instructions for execution by the at least one processor to cause the apparatus to:
receive a first reference signal from a communications device;
determine an initialization factor, $c_{init}$, wherein the initialization factor satisfies:

$$c_{init} = \left(2^{17}\left(N_{symb}^{slot}n_{s,f}^{\mu} + l + 1\right)\left(2N_{ID}^{g(\lambda,n_{SCID})} + 1\right) + 2N_{ID}^{g(\lambda,n_{SCID})} + g(\lambda, n_{SCID}) + 2^{17}\lfloor \lambda/2 \rfloor\right) \mod 2^{31},$$

where $N_{symb}^{slot}$ is a quantity of symbols in a slot, $n_{s,f}^{\mu}$ is an index of a subframe or the slot, l is an index of a symbol, $n_{SCID}$ is a scrambling factor, $N_{ID}^{g(\lambda,n_{SCID})}$ is a sequence scrambling identity, $\lambda$ is a parameter with a value of 0, 1, or 2, and $g(\lambda, n_{SCID})$ is a function that satisfies:

$g(\lambda, n_{SCID}) = n_{SCID}$, when $\lambda = 0$ or 2; or $g(\lambda, n_{SCID}) = 1 - n_{SCID}$, when $\lambda = 1$ process the first reference signal based on the initialization factor.

5. The apparatus according to claim 4, wherein the parameter is a port number or a code division multiplexing (CDM) group identity.

6. The apparatus according to claim 4, wherein the apparatus further comprises:

send, through a transmitter, first signaling that indicates the parameter to the communications device.

7. A communications system, comprising a first communications device and a second communications device, wherein the first communications device is configured to perform operations comprising:
   receiving a first reference signal from the second communications device;
   determining an initialization factor, $c_{init}$, wherein the initialization factor satisfies:

$$c_{init} = \left(2^{17}\left(N_{symb}^{slot}n_{s,f}^{\mu} + l + 1\right)\left(2N_{ID}^{g(\lambda,n_{SCID})} + 1\right) + 2N_{ID}^{g(\lambda,n_{SCID})} + g(\lambda, n_{SCID}) + 2^{17}\lfloor\lambda/2\rfloor\right)\bmod 2^{31},$$

where $N_{symb}^{slot}$ is a quantity of symbols in a slot, $n_{s,f}^{\mu}$ is an index of a subframe or the slot, l is an index of a symbol, $n_{SCID}$ is a scrambling factor, $N_{ID}^{g(\lambda,n_{SCID})}$ is a sequence scrambling identity, $\lambda$ is a parameter with a value of 0, 1, or 2, and $g(\lambda,n_{SCID})$ is a function that satisfies:

$$g(\lambda, n_{SCID}) = n_{SCID}, \text{ when } \lambda = 0 \text{ or } 2; \text{ or}$$

$$g(\lambda, n_{SCID}) = 1 - n_{SCID}, \text{ when } \lambda = 1;$$

processing the first reference signal based on the initialization factor.

8. The system according to claim 7, wherein the parameter is a port number or a code division multiplexing (CDM) group identity.

9. The system according to claim 7, wherein the operations further comprising:
   sending, through a transceiver, first signaling that indicates the parameter to the second communications device.

10. A signal processing apparatus, comprising:
   a transceiver;
   at least one processor; and
   a memory coupled to the at least one processor and storing programming instructions for execution by the at least one processor to perform operations comprising:
      receiving a first reference signal from the second communications device;
      determining an initialization factor, $c_{init}$, wherein the initialization factor satisfies:

$$c_{init} = \left(2^{17}\left(N_{symb}^{slot}n_{s,f}^{\mu} + l + 1\right)\left(2N_{ID}^{g(\lambda,n_{SCID})} + 1\right) + 2N_{ID}^{g(\lambda,n_{SCID})} + g(\lambda, n_{SCID}) + 2^{17}\lfloor\lambda/2\rfloor\right)\bmod 2^{31},$$

where $N_{symb}^{slot}$ is a quantity of symbols in a slot, $n_{s,f}^{\mu}$ is an index of a subframe or the slot, l is an index of a symbol, $n_{SCID}$ is a scrambling factor, $N_{ID}^{g(\lambda,n_{SCID})}$ is a sequence scrambling identity, $\lambda$ is a parameter with a value of 0, 1, or 2, and $g(\lambda,n_{SCID})$ is a function that satisfies:

$$g(\lambda, n_{SCID}) = n_{SCID}, \text{ when } \lambda = 0 \text{ or } 2; \text{ or}$$

$$g(\lambda, n_{SCID}) = 1 - n_{SCID}, \text{ when } \lambda = 1; \text{ and}$$

processing the first reference signal based on the initialization factor.

11. The apparatus according to claim 10, wherein the parameter is a port number or a code division multiplexing (CDM) group identity.

12. The apparatus according to claim 10, wherein the operations further comprising:
   sending, through the transceiver, first signaling that indicates the parameter.

13. A non-transitory, computer-readable storage medium, storing programming instructions executable by at least one processor to perform operations comprising:
   receiving a first reference signal from the second communications device;
   determining an initialization factor, $c_{init}$, wherein the initialization factor satisfies:

$$c_{init} = \left(2^{17}\left(N_{symb}^{slot}n_{s,f}^{\mu} + l + 1\right)\left(2N_{ID}^{g(\lambda,n_{SCID})} + 1\right) + 2N_{ID}^{g(\lambda,n_{SCID})} + g(\lambda, n_{SCID}) + 2^{17}\lfloor\lambda/2\rfloor\right)\bmod 2^{31},$$

where $N_{symb}^{slot}$ is a quantity of symbols in a slot, $n_{s,f}^{\mu}$ is an index of a subframe or the slot, l is an index of a symbol, $n_{SCID}$ is a scrambling factor, $N_{ID}^{g(\lambda,n_{SCID})}$ is a sequence scrambling identity, $\lambda$ is a parameter with a value of 0, 1, or 2, and $g(\lambda,n_{SCID})$ is a function that satisfies:

$$g(\lambda, n_{SCID}) = n_{SCID}, \text{ when } \lambda = 0 \text{ or } 2; \text{ or}$$

$$g(\lambda, n_{SCID}) = 1 - n_{SCID}, \text{ when } \lambda = 1; \text{ and}$$

processing the first reference signal based on the initialization factor.

14. The non-transitory, computer-readable storage medium according to claim 13, wherein the parameter is a port number or a code division multiplexing (CDM) group identity.

15. The non-transitory, computer-readable storage medium according to claim 13, wherein the operations further comprising:
   sending first signaling that indicates the parameter to the communications device.

\* \* \* \* \*

UNITED STATES PATENT AND TRADEMARK OFFICE
CERTIFICATE OF CORRECTION

PATENT NO. : 12,237,959 B2
APPLICATION NO. : 18/538375
DATED : February 25, 2025
INVENTOR(S) : Kunpeng Liu et al.

Page 1 of 1

It is certified that error appears in the above-identified patent and that said Letters Patent is hereby corrected as shown below:

On the Title Page

Item (57), (Abstract), In Line 6, Delete "parameter," and insert -- parameter; --.

In the Claims

In Column 16, In Line 15, In Claim 1, delete "a" and insert -- the --.

In Column 16, In Line 15, In Claim 1, delete "1" and insert -- l --.

In Column 16, In Line 16, In Claim 1, after "factor," delete "and".

In Column 16, In Line 50 (Approx.), In Claim 4, delete "1" and insert -- l --.

In Column 17, In Line 19 (Approx.), In Claim 7, delete "1" and insert -- l --.

In Column 17, In Line 45, In Claim 10, delete "receiving" and insert -- receiving, through the transceiver, --.

In Column 17, In Line 45, In Claim 10, delete "the second" and insert -- a --.

In Column 17, In Line 57, In Claim 10, delete "1" and insert -- l --.

In Column 18, In Line 23, In Claim 13, delete "the second" and insert -- a --.

In Column 18, In Line 35, In Claim 13, delete "1" and insert -- l --.

Signed and Sealed this
Twenty-second Day of July, 2025

Coke Morgan Stewart
*Acting Director of the United States Patent and Trademark Office*